United States Patent
Choi et al.

(10) Patent No.: US 10,018,771 B2
(45) Date of Patent: Jul. 10, 2018

(54) DISPLAY BACKLIGHT UNIT HAVING MULTIPLE LIGHT GUIDE PLATES, AND METHOD OF MANUFACTURING

(71) Applicant: Samsung Electronics Co., Ltd., Suwon-si, Gyeonggi-do (KR)

(72) Inventors: Kyuhwan Choi, Yongin-si (KR); Jinho Lee, Suwon-si (KR); Yoonsun Choi, Yongin-si (KR); Dong Kyung Nam, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 351 days.

(21) Appl. No.: 14/753,221

(22) Filed: Jun. 29, 2015

(65) Prior Publication Data

US 2016/0139326 A1    May 19, 2016

(30) Foreign Application Priority Data

Nov. 19, 2014 (KR) .................... 10-2014-0161737

(51) Int. Cl.
*G02B 6/00* (2006.01)
*F21V 8/00* (2006.01)

(52) U.S. Cl.
CPC .......... *G02B 6/0076* (2013.01); *G02B 6/0038* (2013.01); *G02B 6/0051* (2013.01)

(58) Field of Classification Search
CPC .. G02B 6/0011; G02B 6/0033; G02B 6/0035; G02B 6/0038; G02B 6/005; G02B 6/0053; G02B 6/0055; G02B 6/0075; G02B 6/0076; G02F 1/133615
See application file for complete search history.

(56) References Cited

U.S. PATENT DOCUMENTS

| | | | | |
|---|---|---|---|---|
| 7,534,026 B2* | 5/2009 | Uehara | ............... | G02B 6/0053 349/65 |
| 7,692,733 B2* | 4/2010 | Daiku | .................. | G02B 6/0038 349/61 |

(Continued)

FOREIGN PATENT DOCUMENTS

| KR | 20130028645 A | 3/2013 |
|---|---|---|
| KR | 20130064333 A | 6/2013 |

(Continued)

*Primary Examiner* — Ismael Negron
(74) *Attorney, Agent, or Firm* — Harness, Dickey & Pierce, P.L.C.

(57) ABSTRACT

A display device with a display panel, and backlight unit including a first light guide plate (LGP) having first and second optical materials, a second LGP disposed between the first LGP and the display panel, light sources configured to provide light to the first LGP and the second LGP, and a diffuser plate in a lower portion of the second LGP. The first LGP configured such that light from a light source is guided by the second optical material and emitted towards the display panel through the first optical material; the second LGP configured to emit light towards the display panel using the diffuser plate. A controller controls the light sources to provide light to the first LGP if a three-dimensional (3D) image is displayed on the display panel, and to the second LGP if a two-dimensional (2D) image is displayed on the display panel.

18 Claims, 14 Drawing Sheets

(56) References Cited

U.S. PATENT DOCUMENTS

| | | | |
|---|---|---|---|
| 8,325,295 B2 * | 12/2012 | Sugita | G02B 6/003 |
| | | | 349/62 |
| RE44,063 E * | 3/2013 | Uehara | G02B 6/0053 |
| | | | 349/65 |
| 8,403,487 B2 | 3/2013 | Lee et al. | |
| 2008/0131667 A1 | 6/2008 | King et al. | |
| 2009/0067156 A1 * | 3/2009 | Bonnett | G02B 6/0068 |
| | | | 362/97.2 |

FOREIGN PATENT DOCUMENTS

| KR | 20130085370 A | 7/2013 |
| --- | --- | --- |
| KR | 101320052 B1 | 10/2013 |
| KR | 20130134405 A | 12/2013 |
| KR | 20140020430 A | 2/2014 |
| KR | 20140056075 A | 5/2014 |
| KR | 20140074438 A | 6/2014 |

* cited by examiner

FIG. 13
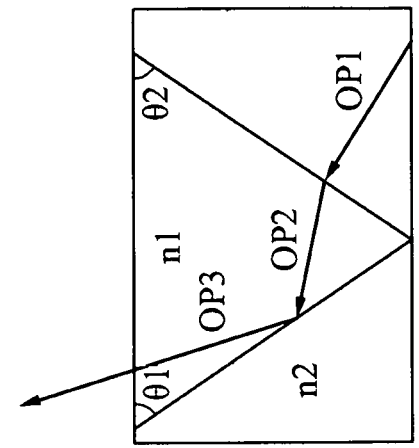
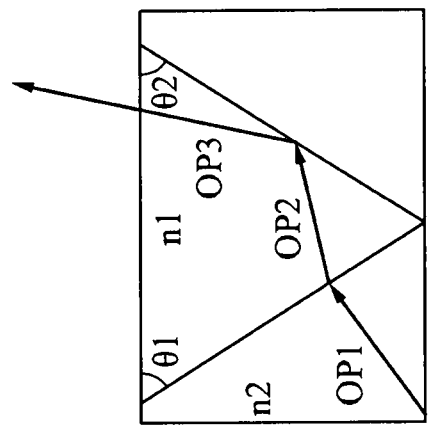
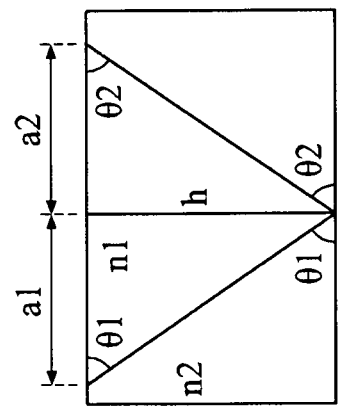

DISPLAY BACKLIGHT UNIT HAVING MULTIPLE LIGHT GUIDE PLATES, AND METHOD OF MANUFACTURING

CROSS-REFERENCE TO RELATED APPLICATION

This application claims the priority benefit of Korean Patent Application No. 10-2014-0161737, filed on Nov. 19, 2014, in the Korean Intellectual Property Office, the entire contents of which are incorporated herein by reference in its entirety.

BACKGROUND

1. Field

At least one example embodiment relates to a backlight unit, a display device including the backlight unit, and/or a method of manufacturing the backlight unit.

2. Description of the Related Art

In general, a three-dimensional (3D) image is configured based on stereo view principles using two eyes of a person. A 3D image display may be a stereoscopic display and an autostereoscopic display. The autostereoscopic display acquires a 3D image by separating an image into a left image and a right image without using glasses, and uses, for example, a parallax barrier method and/or a lenticular method.

Here, in the case of the parallax barrier method and/or the lenticular method, once a design is completed, the design may not be readily modified, optical efficiency may be low, and a crosstalk between a left image and a right image may be relatively high. In addition, some autostereoscopic displays employing the parallax barrier method and/or the lenticular method do not readily achieve a two-dimensional (2D) display. Alternatively, even if an autostereoscopic display employing the parallax barrier method and/or the lenticular method is capable of achieving the 2D display, the quality of a 2D image may be degraded.

SUMMARY

At least one example embodiment relates to a backlight unit.

According to at least one example embodiment, a backlight unit includes a first light guide plate (LGP) including a first optical material and a second optical material having different refractive indices, and configured to emit a light guided through the second optical material toward a display panel using the first optical material, a second LGP disposed between the first LGP and the display panel, and configured to emit the light toward the display panel using a diffuser plate provided in a lower portion of the second LGP, and light sources configured to provide the light to the first LGP when a three-dimensional (3D) image is displayed on the display panel, and to provide the light to the second LGP when a two-dimensional (2D) image is displayed on the display panel.

At least one example embodiment provides that the refractive index of the first optical material may be higher than the refractive index of the second optical material.

At least one example embodiment provides that the first optical material may be slanted at a desired (or alternatively, predetermined) angle with respect to the display panel.

At least one example embodiment provides that the first optical material may be provided in a zigzagged form.

At least one example embodiment provides that the first optical material may be provided in a zigzagged form to provide the light to a pixel corresponding to one of views displayed on the display panel.

At least one example embodiment provides that the first optical material may be disposed in an upper portion of the first LGP.

At least one example embodiment provides that the first optical material may include air.

At least one example embodiment provides that the first LGP may include a reflector sheet disposed between the first optical materials and configured to reflect the light reaching an upper portion of the first LGP, so that the light incident from the light sources is emitted through the first optical material.

At least one example embodiment provides that the diffuser plate may be provided to correspond to a reflector sheet disposed between the first optical materials.

At least one example embodiment provides the backlight unit that may further include a gap disposed between the first LGP and the second LGP.

At least one example embodiment provides that a viewing angle or the number of views of the 3D image displayed on the display panel may be determined based on the gap.

At least one example embodiment provides that the first LGP and the second LGP may be driven based on a time division method using the light sources.

At least one example embodiment provides that the second optical material may be provided to surround the first optical material.

At least one example embodiment relates to a display device.

According to at least one example embodiment, a display device includes a first LGP including a first optical material and a second optical material having different refractive indices, and configured to emit a light guided through the second optical material toward a display panel using the first optical material, a second LGP disposed between the first LGP and the display panel, and configured to emit the light toward the display panel using a diffuser plate provided in a lower portion of the second LGP, light sources configured to provide the light to the first LGP when a 3D image is displayed on the display panel and to provide the light to the second LGP when a 2D image is displayed on the display panel, and the display panel configured to receive the light from the first LGP to display the 3D image, or configured to receive the light from the second LGP to display the 2D image.

At least one example embodiment relates to a method.

According to at least one example embodiment, a method of manufacturing a display panel includes generating a first LGP including a first optical material and a second optical material having different refractive indices, and configured to emit a light incident from a first light source and guided through the second optical material toward a display panel using the first optical material, and generating a second LGP disposed between the first LGP and the display panel, and configured to emit a light incident from a second light source toward the display panel using a diffuser plate provided in a lower portion of the second LGP, wherein the first light source is configured to provide the light to the first LGP when a 3D image is displayed on the display panel, and the second light source is configured to provide the light to the second LGP when a 2D image is displayed on the display panel.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 13 illustrates a process of emitting a light from an LGP according to example embodiments.

DETAILED DESCRIPTION OF EXAMPLE EMBODIMENTS

Figure 1:
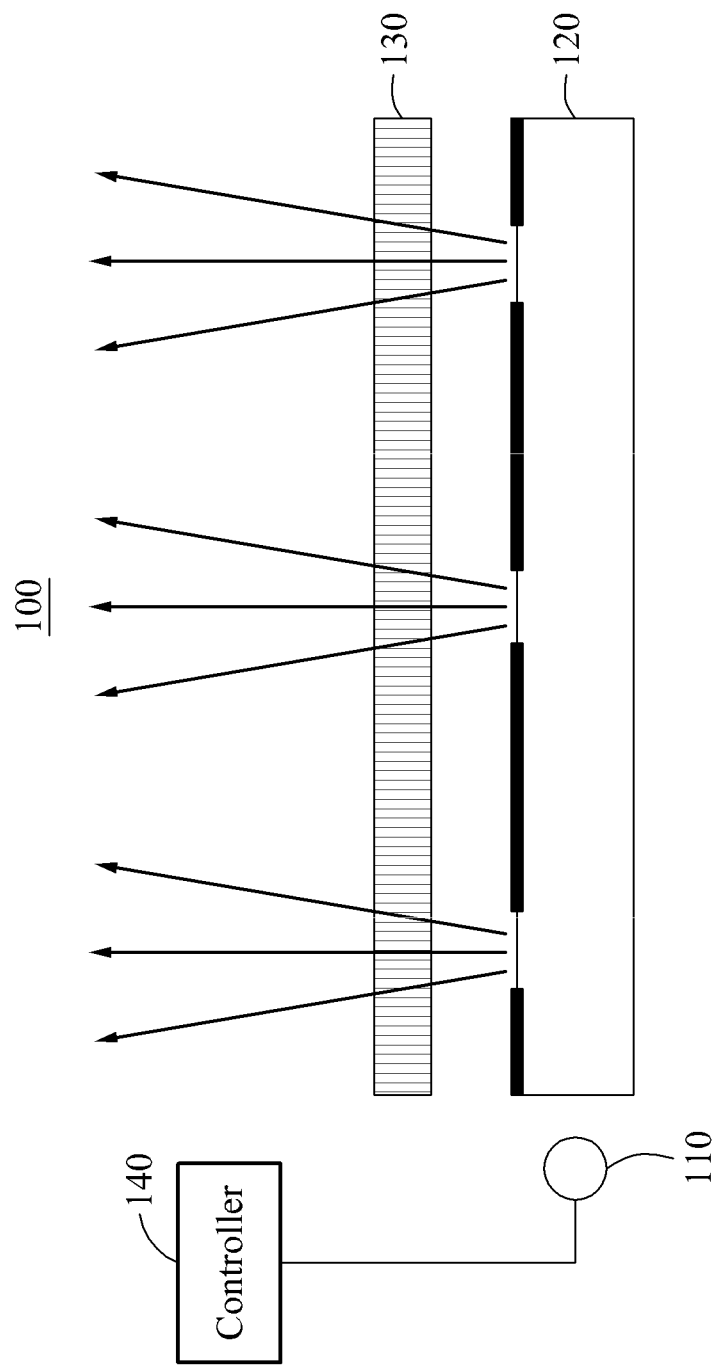
FIG. 1 is a cross-sectional view illustrating a display device according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a cross-sectional view illustrating a display device 100 according to at least one example embodiment.

Referring to FIG. 1, the display device 100 includes a light source 110, a light guide plate (LGP) 120, and a display panel 130, and a controller 140 (e.g., a special purpose processor) for controlling the light source 110. The display device 100 refers to a device to output an image and thus, any type of devices configured to output an image by applying a power may be employed as the display device 100.

The light source 110 refers to a device to generate a light and may include, for example, a light emitting diode (LED) and a laser. The light source 110 may provide the generated light to the LGP 120 under control of the controller 140. For example, as illustrated in FIG. 1, the light source 110 may be positioned on one side of the LGP 120. The light source 110 may be positioned on each of both sides of the LGP 120. Alternatively, the light source 110 may be positioned in a lower portion of the LGP 120.

The LGP 120 refers to a device to emit a light incident from the light source 110 toward the display panel 130. The LGP 120 may receive the light from the light source 110 through a light incident surface. For example, the LGP 120 may include one of poly methyl methacrylate (PMMA), polyether sulfone (PES), and polycarbonate (PC). In FIG. 1, the light incident surface of the LGP 120 may be a left surface on which the light source 110 is positioned.

The LGP 120 may guide the incident light based on a total reflection condition. The LGP 120 may emit the guided light through an aperture formed on a top of the LGP 120. In this instance, the light emitted from the LGP 120 may be a line light source having a directivity or a directional nature.

The display panel 130 refers to a device to display a two-dimensional (2D) image or a three-dimensional (3D) image based on an input image signal, and may include, for example, a flat panel display (FPD). Since the display panel 130 itself does not emit a light, the display panel 130 may receive the light through the light source 110 and the LGP 120. For example, the display panel 130 may include a liquid crystal panel to display an image in desired (or alternatively, predetermined) color using the provided light. The display panel 130 may include a plurality of pixels.

The light source 110 and the LGP 120 to provide the light to the display panel 130 may configure a backlight unit. Hereinafter, a structure and an operation of the backlight unit to provide the light to the display panel 130 will be further described.

Figure 2:
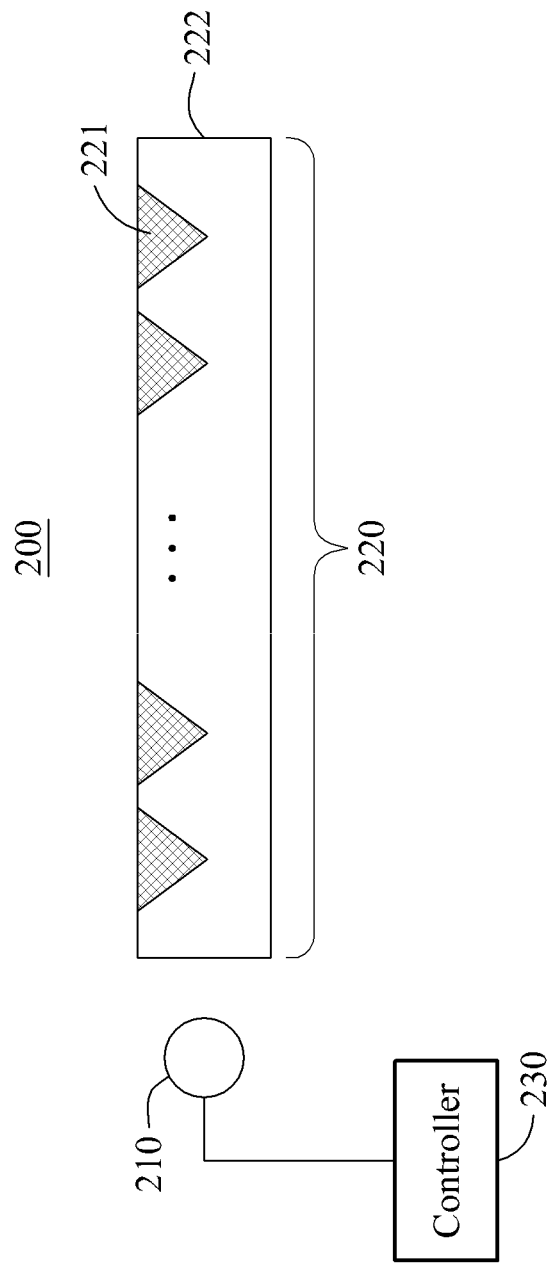
FIG. 2 is a cross-sectional view illustrating an example of a backlight unit according to at least one example embodiment.

FIG. 2 is a cross-sectional view illustrating an example of a backlight unit 200 according to at least one example embodiment.

Referring to FIG. 2, the backlight unit 200 may include a light source 210 and an LGP 220. The backlight unit 200 refers to a device positioned on a rear surface of a display panel and may provide a light to the display panel.

The light source 210 may generate a light under control of the controller 230 and may provide the generated light to the LGP 220. Although the controller 230 is shown as being part of the backlight unit 200, it should be understood that the controller 230 may be a separate device within, for example, the display device 100 in FIG. 1. For example, as illustrated in FIG. 2, the light source 210 may be positioned on one side of the LGP 220. Alternatively, the light source 210 may be positioned on each of both sides of the LGP 220. Hereinafter, for conciseness, a description will be made based on the light source 210 positioned on one side of the LGP 220, however, the example embodiments are not limited thereto.

The LGP 220 may emit the light incident from the light source 210 toward the display panel by applying a directivity to the incident light. The LGP 220 may include a first optical material 221 and a second optical material 222 having different refractive indices.

The refractive index of the first optical material 221 may be higher than the refractive index of the second optical material 222. As illustrated in FIG. 2, the LGP 221 may include a plurality of first optical materials 221 each in a triangular shape. Further, the first optical material 221 may be provided in an inverted triangular shape or a prism shape and positioned in an upper portion of the LGP 220. The first optical material 221 may emit the light guided from the LGP 220 toward the display panel. Since the light guided from the LGP 220 is emitted using the first optical material 221 the first optical material 221 may correspond to an aperture of the LGP 220.

The second optical material 222 may be provided to surround the first optical material 221. The second optical material 222 may refer to a remaining portion excluding the first optical material 221 in the LGP 220. The second optical material 222 may guide the light incident from the light source 210 toward the first optical material 221.

The first optical material 221 and the second optical material 222 may be materials that enable the light incident from the light source 210 to be propagated and may include one of, for example, a transparent lens, a transparent prism, and a transparent polymer. The first optical material 221 may include air.

Figure 3:
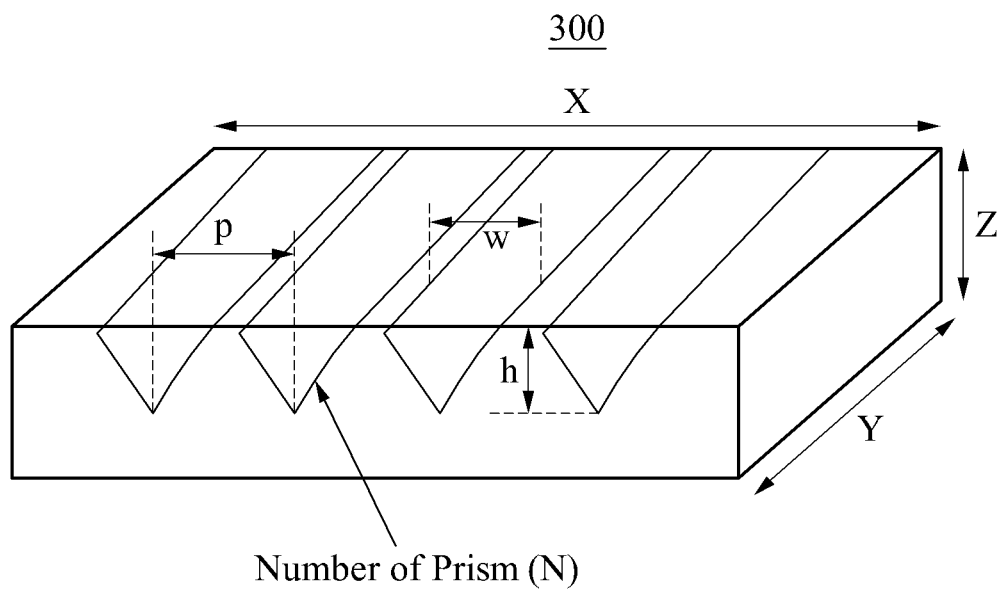
FIG. 3 is a perspective view to describe a design parameter of a light guide plate (LGP) according to at least one example embodiment.

FIG. 3 is a perspective view to describe a design parameter of an LGP 300 according to at least one example embodiment.

Referring to FIG. 3, design parameters of the LGP 300 may include a pitch p, a width w, a height h, and a slanted angle. The design parameters may further include the number of first optical materials, for example, the number of prisms N and sizes, for example, X, Y, and Z, of the LGP 300. A further description related to a slanted angle will be made with reference to FIGS. 10 through 12.

The pitch p denotes an interval between first optical materials and the width w denotes a width of a portion in which a light is emitted from the first optical material. The height h denotes a height of a triangular cross section of the first optical material and the number of first optical materials N denotes the number of first optical materials included in the LGP 300.

The width w of the first optical material may be determined based on a size of a pixel included in the display panel. When a 3D image is displayed on the display panel, a quality of the 3D image may be determined based on a ratio of a line width to a pixel width. The pixel width denotes the size of the pixel included in the display panel and the line width denotes the width of the first optical material. According to a decrease in the ratio of the line width to the pixel width, a crosstalk of the 3D image displayed on the display panel may decrease and a depth of the 3D image may increase. That is, according to a decrease in the ratio of the line width to the pixel width, the quality of the 3D image may be enhanced.

Figure 4:
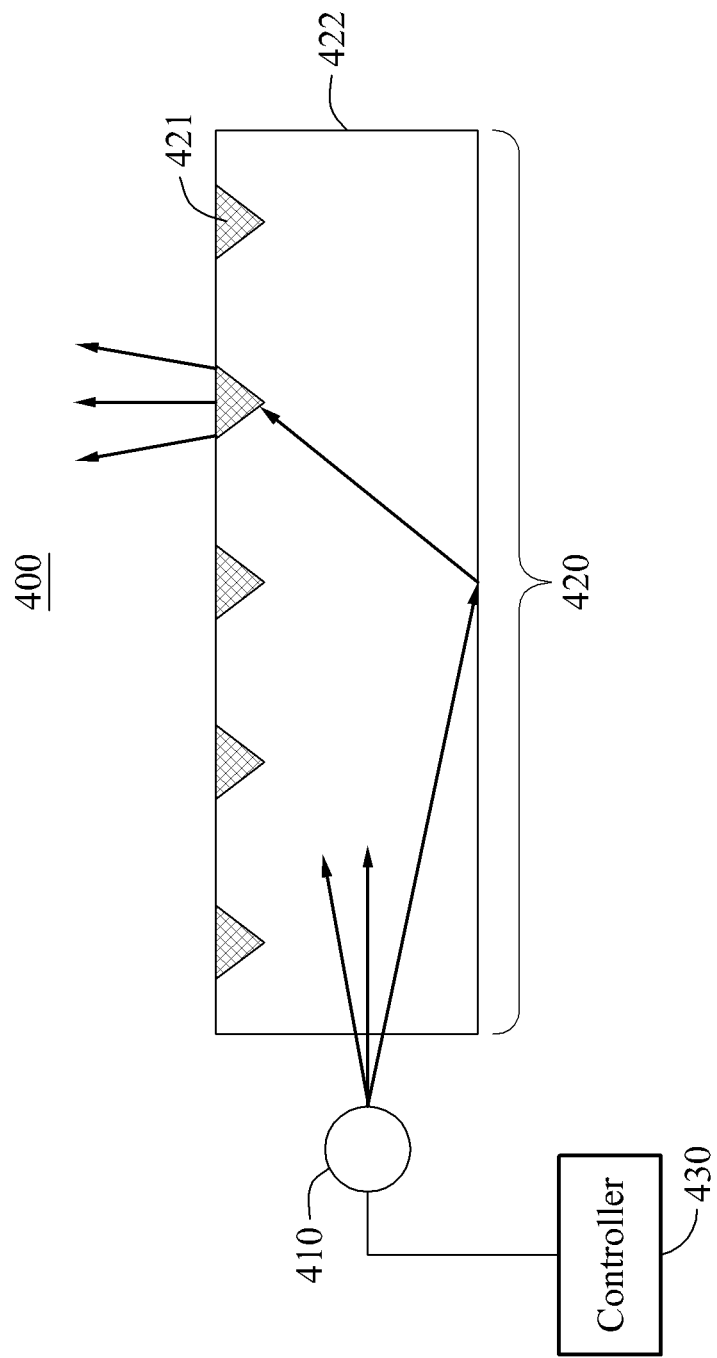
FIG. 4 is a cross-sectional view to describe a process of a backlight unit emitting a light according to at least one example embodiment.

FIG. 4 is a cross-sectional view to describe a process of a backlight unit 400 emitting a light according to at least one example embodiment.

Referring to FIG. 4, the backlight unit 400 may include a light source 410 and an LGP 420. The backlight unit 400 may be an edge-type backlight unit including the light source 410 on one side of the LGP 420. The LGP 420 may include a first optical material 421 and a second optical material 422 having different refractive indices. The refractive index of the first optical material 421 may be higher than the refractive index of the second optical material 422.

A light incident from the light source 410 (under control of the controller 430) may be guided along the LGP 420. For example, referring to FIG. 4, the light may be guided from the left to the right within the second optical material 422. The light reaching a bottom of the second optical material 422 may be reflected in order not to be emitted to an outside of the LGP 420. When the light being guided within the second optical material 422 reaches the first optical material 421, the light may be emitted to the outside of the LGP 420 through the first optical material 421.

Since the LGP 420 emits the light toward the display panel through the first optical material 421, the emitted light may have a directivity or a directional nature. That is, the LGP 420 may operate as a line light source to emit the light toward the display panel by applying the directivity or the directional nature to the light incident from the light source 410 using the second optical material 422 guiding the light incident from the light source 410 and the first optical material 421 emitting the guided light toward the display panel.

Figure 5:
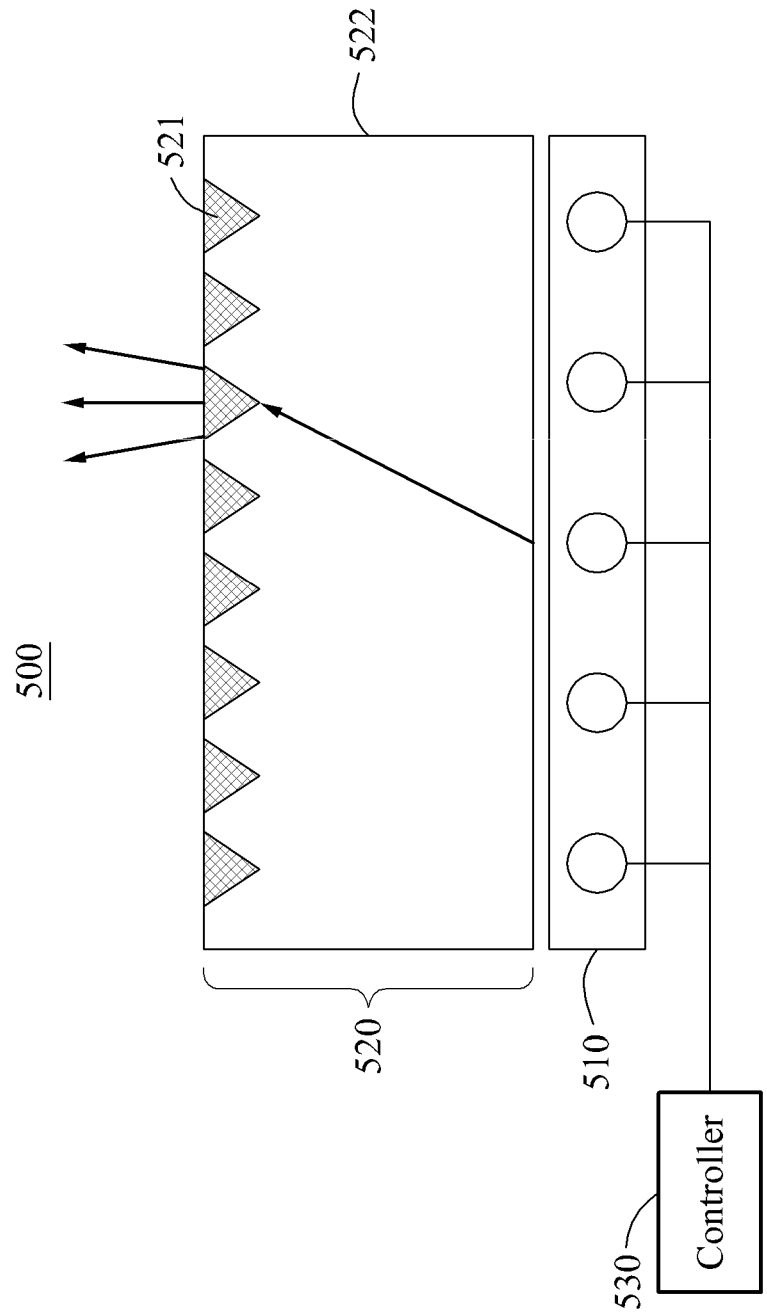
FIG. 5 is a cross-sectional view illustrating another example of a backlight unit according to at least one example embodiment.

FIG. 5 is a cross-sectional view illustrating another example of a backlight unit 500 according to at least one example embodiment.

Referring to FIG. 5, the backlight unit 500 may be a direct-type backlight unit including a light source 510 positioned below an LGP 520. The LGP 520 may include a first optical material 521 and a second optical material 522 having different refractive indices. The refractive index of the first optical material 521 may be higher than the refractive index of the second optical material 522.

A light incident from the light source 510 (under control of the controller 530) may be guided along the LGP 520. For example, referring to FIG. 5, the light may be guided from downward to upward within the second optical material 522. When the light being guided within the second optical material 522 reaches the first optical material 521 positioned in an upper portion of the LGP 520, the light may be emitted to an outside of the LGP 520 through the first optical material 521. When the light being guided within the second optical material 522 reaches a top in which the first optical material 521 is absent, instead of reaching the first optical material 521 of the LGP 520, the light may be reflected without being emitted to the outside of the LGP 520. The reflected light may be reflected again from the bottom and emitted to the outside of the LGP 520 through the first optical material 521 positioned in the upper portion of the LGP 520. That is, the light reflection may be repeated on the bottom and the top of the LGP 520 until the light reaches the first optical material 521.

Since the LGP 520 emits the light toward the display panel through the first optical material 521, the emitted light may have a directivity or a directional nature. That is, the LGP 520 may operate as a line light source to emit the light toward the display panel by applying the directivity or the directional nature to the light incident from the light source 510 using the second optical material 522 guiding the light incident from the light source 510 and the first optical material 521 emitting the guided light toward the display panel.

Figure 6:
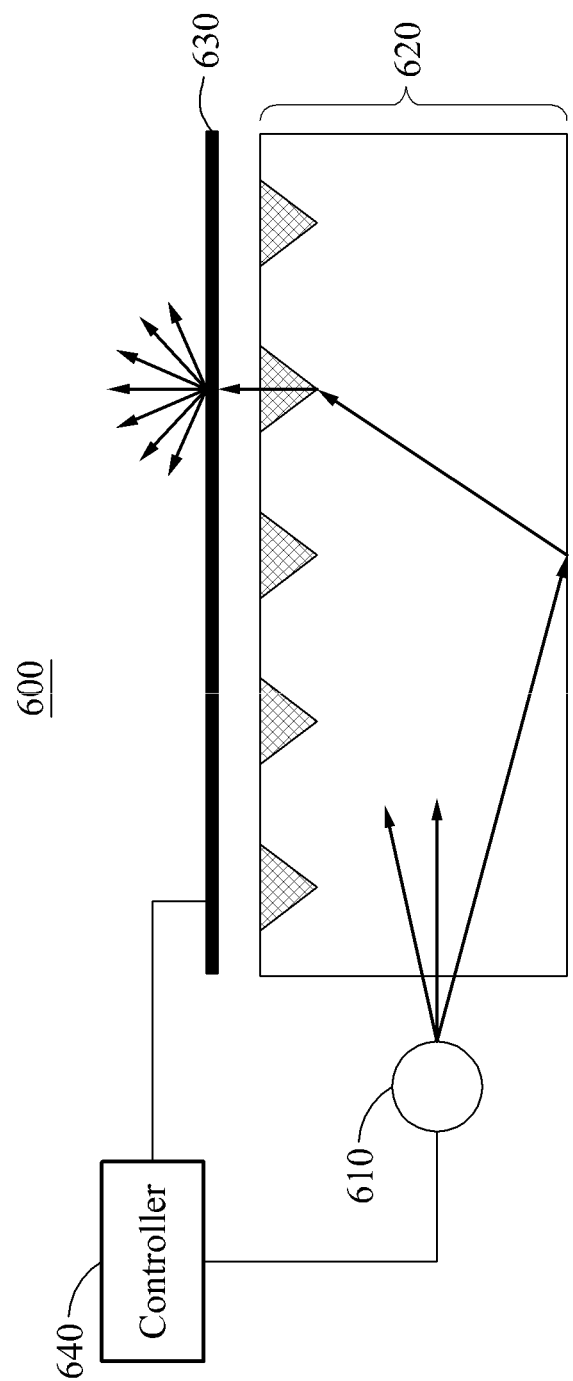
FIG. 6 is a cross-sectional view illustrating an example of adjusting a property of a light emitted from a backlight unit according to at least one example embodiment.

FIG. 6 is a cross-sectional view illustrating an example of adjusting a property of a light emitted from a backlight unit 600 according to at least one example embodiment.

Referring to FIG. 6, the backlight unit 600 may perform switching between 2D and 3D and may include a light source 610, an LGP 620, and a diffuser plate 630. The LGP 620 may emit a light incident from the light source 610 (under control of the controller 640) toward the display panel by applying a directivity to the incident light using a first optical material and a second optical material having different refractive indices.

The description made above with reference to FIGS. 2 through 5 may be applicable to the light source 610 and the LGP 620 and thus, a further description will be omitted.

The diffusion plate 630 refers to a device of which a transparency level varies based on whether a voltage is applied (e.g., by the controller 640), and may include, for example, a polymer dispersed liquid crystal (PDLC). For example, when a voltage is applied to the diffuser plate 630, the diffuser plate 630 may have a high transparency level and thus, the diffuser plate 630 may allow most of the light reaching the diffuser plate 630 to pass as is. The light emitted from the LGP 620 may reach the display panel with maintaining the directivity.

Conversely, when a voltage is not applied to the diffusion plate 630, the diffuser plate 630 may have a low transparency level and thus, the diffuser plate 630 may diffuse the light reaching the diffuser plate 630. For example, FIG. 6 illustrates the diffuser plate 630 having a low transparency level because a voltage is not applied to the diffuser plate 630. The light emitted from the LGP 620 may lose the directivity while passing through the diffuser plate 630. That is, the diffuser plate 630 removes the directivity from the light emitted from the LGP 620 and thus, the LGP 620 may operate as a surface light source. The light passing through the diffuser plate 630 may be uniformly provided to the display panel.

Figure 7:
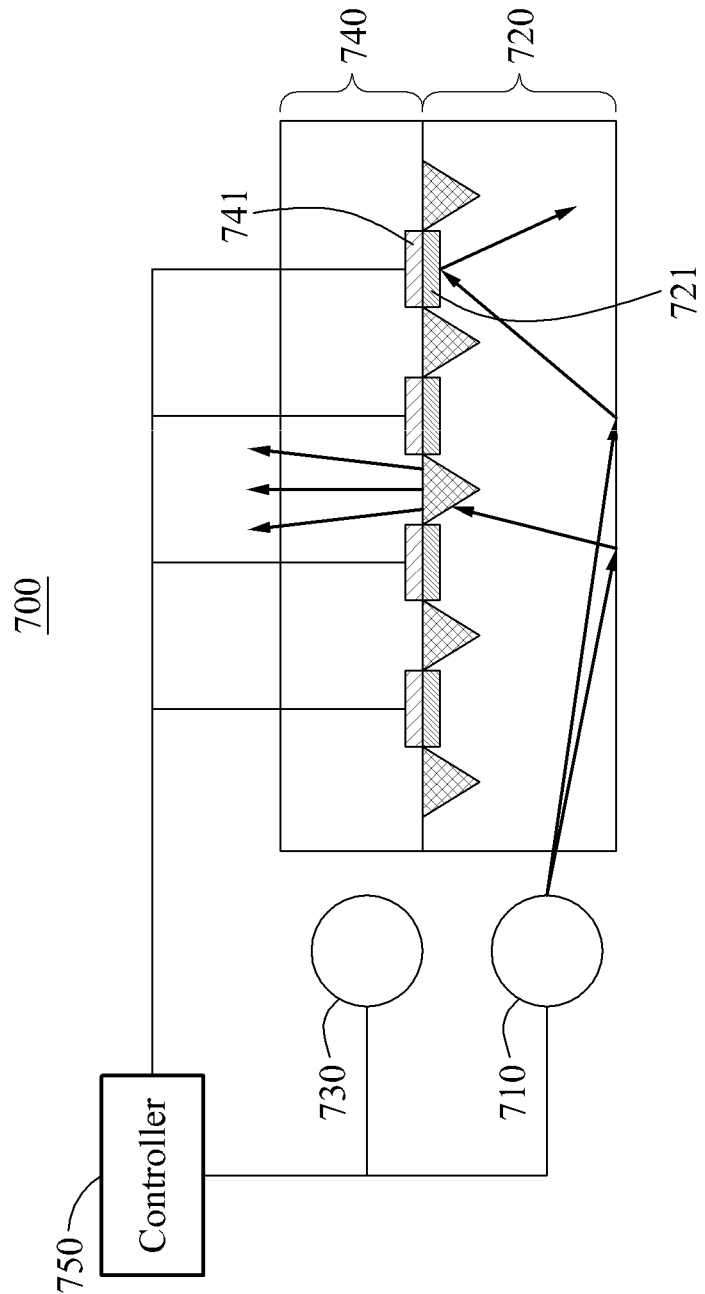
FIG. 7 is a cross-sectional view to describe an operation of a backlight unit capable of performing switching between two-dimension (2D) and three-dimension (3D) when a 3D image is displayed on a display panel according to at least one example embodiment.

FIG. 7 is a cross-sectional view to describe an operation of a backlight unit 700 capable of performing switching between 2D and 3D when a 3D image is displayed on a display panel according to at least one example embodiment.

Referring to FIG. 7, the backlight unit 700 may include a first light source 710, a first LGP 720, a second light source 730, and a second LGP 740. The second LGP 740 is disposed between the first LGP 720 and the display panel, and may include a diffusion plate 741 in a lower portion of the second LGP 740. Here, the diffuser plate 741 may include a desired (or alternatively, predetermined) material having a desired (or alternatively, predetermined) transparency level or may include PDLC of which a transparency level varies based on whether a voltage is applied (e.g., by the controller 750).

Each of the first light source 710 and the second light source 730 (both under control of the controller 750) refers to a device to generate a light and may include, for example, an LED and a laser. The first light source 710 may be positioned on the same layer as the first LGP 720 and may provide the light to the first LGP 720. Alternatively, the first light source 710 may be positioned below the first LGP 720, and the first light source 710 and the first LGP 720 may be provided in a type of a direct-type backlight unit. The second light source 730 may be positioned on the same layer as the second LGP 740 and may provide the light to the second LGP 740. When the 3D image is displayed on the display panel, the first light source 710 may provide the light to the first LGP 720. However, the second light source 730 may not provide the light to the second LGP 740.

The first LGP 720 may operate as a 3D LGP. The first LGP 720 may emit the light incident from the first light source 710 toward the display panel by applying a directivity to the incident light. The first LGP 720 may operate as a line light source by applying the directivity to the incident light using a first optical material and a second optical material having different refractive indices. The first LGP 720 may include a reflector sheet 721 between the first optical materials.

For example, as illustrated in FIG. 7, the second optical material may guide the light incident from the first light source 710. The second optical material may reflect the light reaching the bottom not to be deviated from the first LGP 720. When the light being guided within the second optical material reaches the first optical material, the light may be emitted to an outside of the first LGP 720 through the first optical material. In this case, the light may pass through the second LGP 720 and be provided to the display panel.

When the light reaches the reflector sheet 721 positioned between the first optical materials instead of reaching the first optical material, the light may be reflected by the reflector sheet 721 without being emitted to the outside of the first LGP 720. The reflected light may be reflected again from the bottom and emitted to the outside of the first LGP 720 through the first optical material positioned in an upper portion of the first LGP 720. That is, the light reflection may be repeated on the bottom of the first LGP 720 and the reflector sheet 721 until the light is emitted through the first optical material.

The backlight unit 700 capable of performing switching between 2D and 3D may drive the first LGP 720 and the second LGP 740 based on a time division method using the first light source 710 and the second light source 730. That is, the backlight unit 700 may selectively turn ON or OFF the first light source 710 and the second light source 730 to drive only one of the first LGP 720 and the second LGP 740 by dividing a time. In the example of FIG. 7 in which the 3D image is displayed on the display panel, only the first light source 710 is turned ON to provide the light to the first LGP 720.

For example, the backlight unit 700 may include a gap between the first LGP 720 and the second LGP 740. A viewing angle and the number of views of (or the number of viewing locations for viewing) the 3D image displayed on the display panel that receives the light from the first LGP 720 may be determined based on a size of the gap. For example, the viewing angle of the 3D image may increase according to an increase in the size of the gap included in the backlight unit 700. Further, since the number of views of the 3D image is in inverse proportion to the viewing angle of the 3D image, the number of views of the 3D image may decrease according to an increase in the size of the gap. Conversely, according to a decrease in the size of the gap, the viewing angle of the 3D image may decrease and the number of views of the 3D image may increase.

Figure 8:
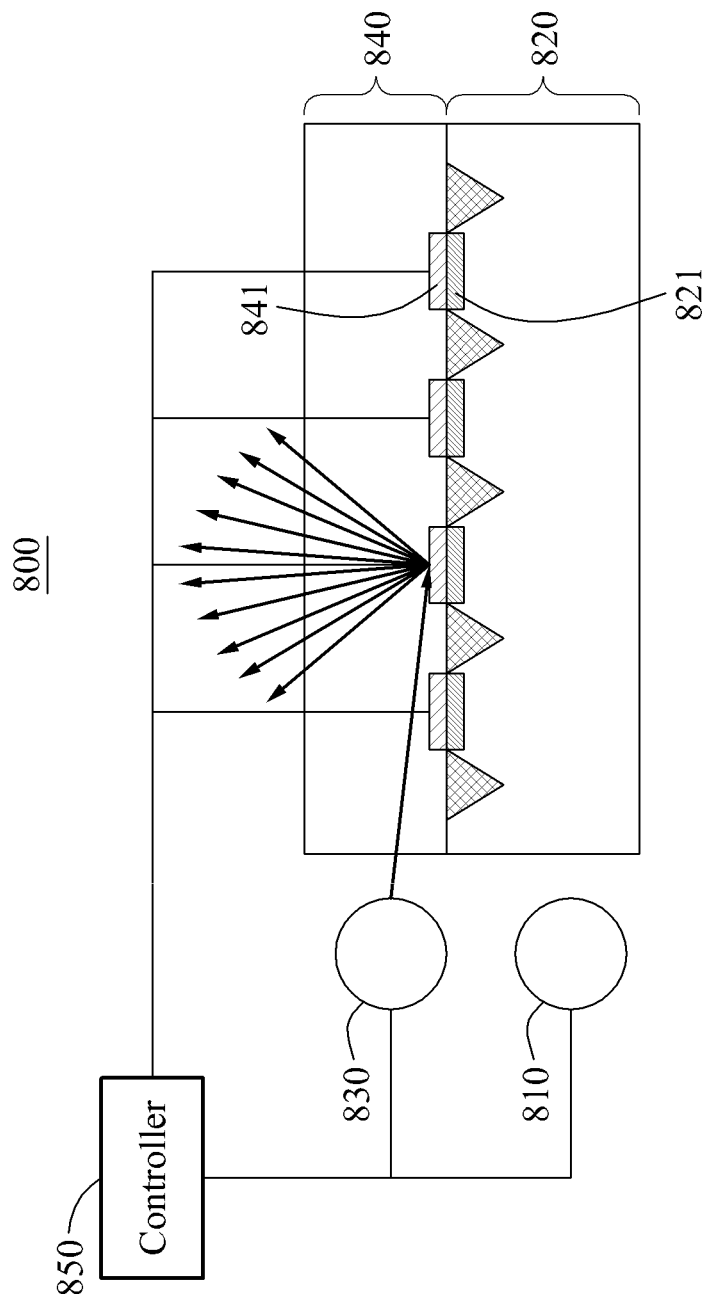
FIG. 8 is a cross-sectional view to describe an operation of a backlight unit capable of performing switching between 2D and 3D when a 2D image is displayed on a display panel according to at least one example embodiment.

FIG. 8 is a cross-sectional view to describe an operation of a backlight unit 800 capable of performing switching between 2D and 3D when a 2D image is displayed on a display panel according to at least one example embodiment.

Referring to FIG. 8, the backlight unit 800 includes a first light source 810, a first LGP 820, a second light source 830, and a second LGP 840.

Each of the first light source 810 and the second light source 830 (both under control of the controller 850) refers to a device to generate a light and may include, for example, an LED and a laser. The second light source 820 may be positioned on the same layer as the second LGP 840 and may provide the light to the second LGP 840. When the 2D is displayed on the display panel, the second light source 830 may provide the light to the second LGP 840 and the first light source 810 may not provide the light to the first LGP 820.

The second LGP 840 may include a diffuser plate 841 in a lower portion of the second LGP 840. The diffuser plate 841 may be disposed to correspond to a reflector sheet 821 of the first LGP 820. The diffuser plate 841 may diffuse the light incident from the second light source 830 so that the light may be emitted from the second LGP 840. For example, the diffuser plate 841 may include a desired (or alternatively, predetermined) material having a desired (or alternatively, predetermined) transparency level, or may include PDLC of which a transparency level varies based on whether a voltage is applied.

For example, as illustrated in FIG. 8, the light incident from the second light source 830 may be guided from the left to the right within the second LGP 840. When the light being guided reaches the diffuser plate 841 positioned in a lower portion of the second LGP 840, the diffuser plate 841 may diffuse the light toward an upper portion of the second LGP 840. Accordingly, the second LGP 840 may uniformly emit the light incident from the second light source 830 toward the display panel. That is, the second LGP 840 may convert the light incident from the second light source 830 to a surface light source and may emit the converted light toward the display panel through the diffusion plate 841.

The backlight unit 800 capable of performing switching between 2D and 3D may drive the first LGP 820 and the second LGP 840 based on a time division method using the first light source 810 and the second light source 830. That is, the backlight unit 800 may selectively turn ON or OFF the first light source 810 and the second light source 830 to drive only one of the first LGP 820 and the second LGP 840 by dividing a time. In the example of FIG. 8 in which the 2D image is displayed on the displayed panel, only the second light source 830 is turned ON to provide the light to the second LGP 840.

For example, the backlight unit 800 may include a gap between the first LGP 820 and the second LGP 840. A viewing angle and the number of views of the 3D image displayed on the display panel that receives the light from the first LGP 820 may be determined based on a size of the gap included in the backlight unit 800. For example, the viewing angle of the 3D image may increase according to the size of the gap included in the backlight unit 800. Further, since the number of views of the 3D image is in inverse proportion to the viewing angle of the 3D image, the number of views of the 3D image may decrease according to an increase in the size of the gap. Conversely, according to a decrease in the size of the gap, the viewing angle of the 3D image may decrease and the number of views of the 3D image may increase.

Figure 9:
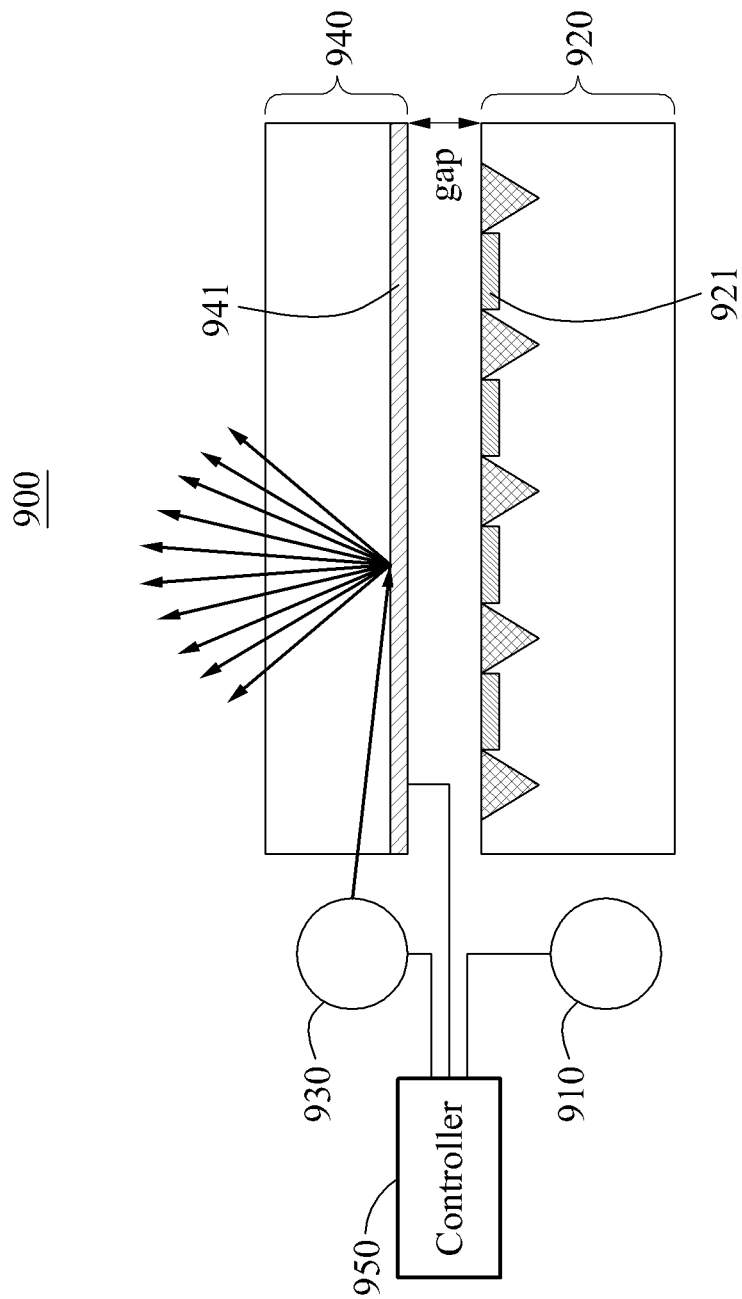
FIG. 9 is a cross-sectional view illustrating a backlight unit capable of performing switching between 2D and 3D including a gap disposed between a first LGP and a second LGP according to at least one example embodiment.

FIG. 9 is a cross-sectional view illustrating a backlight unit 900 capable of performing switching between 2D and 3D including a gap disposed between a first LGP and a second LGP according to at least one example embodiment.

Referring to FIG. 9, the backlight unit 900 capable of performing switching between 2D and 3D may include a first light source 910, a first LGP 920, a second light source 930, and a second LGP 940. The backlight unit 900 may further include a gap between the first LGP 920 and the second LGP 940.

The second LGP 940 may include a diffuser plate 941 in a lower portion of the second LGP 940. In this example, the diffuser plate 941 is not a reflector sheet 921 of the first LGP 920, which differs from the diffuser plate 841 of FIG. 8. The diffuser plate 941 refers to a device of which a transparency level varies based on whether a voltage is applied, and may include, for example, PDLC. When the 2D image is displayed on the display panel, a voltage is not applied to the diffuser plate 941 and the diffuser plate 941 may have a transparency level lower than a threshold value. Accordingly, the light being guided along the second LGP 940 may reach the diffuser plate 941 and be emitted toward an upper portion of the second LGP 940. That is, the second LGP 940 may uniformly emit the light incident from the second light source 930 (under control of the controller 950) toward the display panel using the diffuser plate 941 positioned in the lower portion of the second LGP 940.

When the 3D image is displayed on the display panel, the first LGP 920 may emit the light incident from the first light source 910 (under control of the controller 950) toward the display panel by applying a directivity to the incident light using a first optical material and a second optical material having different refractive indices. The light emitted from the first LGP 920 may pass through the gap positioned between the first LGP 920 and the second LGP 940, and be provided to the display panel.

A viewing angle and the number of views of the 3D image displayed on the display panel that receives the light from the first LGP 920 may be determined based on a size of the gap. For example, the viewing angle of the 3D image may increase according to an increase in the size of the gap included in the backlight unit 900. Further, since the number of views of the 3D image displayed on the display panel is in inverse proportion to the viewing angle of the 3D image, the number of views of the 3D image may decrease according to an increase in the size of the gap. Conversely, according to a decrease in the size of the gap, the viewing angle of the 3D image may decrease and the number of views of the 3D image may increase.

In this example, a desired (or alternatively, predetermined) voltage may be applied to the diffuser plate 941 (under control of the controller 950) and the diffuser plate 941 may have a transparency level higher than a threshold value. Accordingly, the light emitted from the first LGP 920 may pass through the second LGP 940 including the diffuser plate 941 and may reach the display panel while maintaining the directivity.

Figure 10:
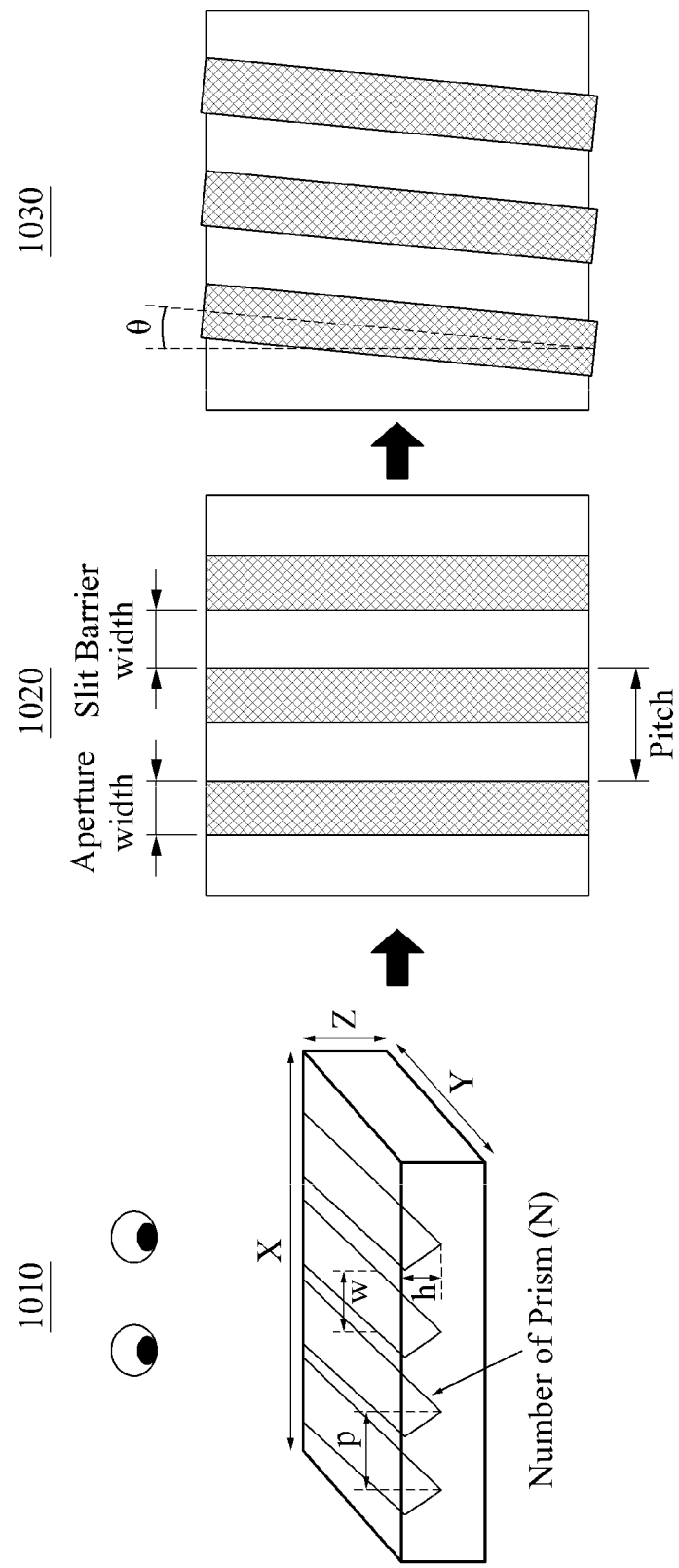
FIG. 10 illustrates an example of a first optical material slanted at a desired (or alternatively, predetermined) angle according to at least one example embodiment.

FIG. 10 illustrates an example of a first optical material slanted at a desired (or alternatively, predetermined) angle according to at least one example embodiment.

An example 1010 shows a perspective view of an LGP including a first optical material and a second optical material having different refractive indices.

An example 1020 shows a top view of the LGP. Here, a shaded portion represents a portion in which the first optical material is present and refers to an aperture of the LGP. A non-shaded portion represents a portion in which the first optical material is absent and refers to a slit barrier of the LGP. That is, the LGP may emit the light through the shaded portion.

An example 1030 shows the first optical material of the LGP slanted at a desired (or alternatively, predetermined) angle θ with respect to the display panel. The first optical material may be slanted at the desired (or alternatively, predetermined) angle θ with respect to a pixel included in the display panel. A backlight unit may increase the number of views of the 3D image displayed on the display panel by slanting the first optical material by the desired (or alternatively, predetermined) angle θ. The desired (or alternatively, predetermined) angle θ denotes a slanted angle.

Figure 11:
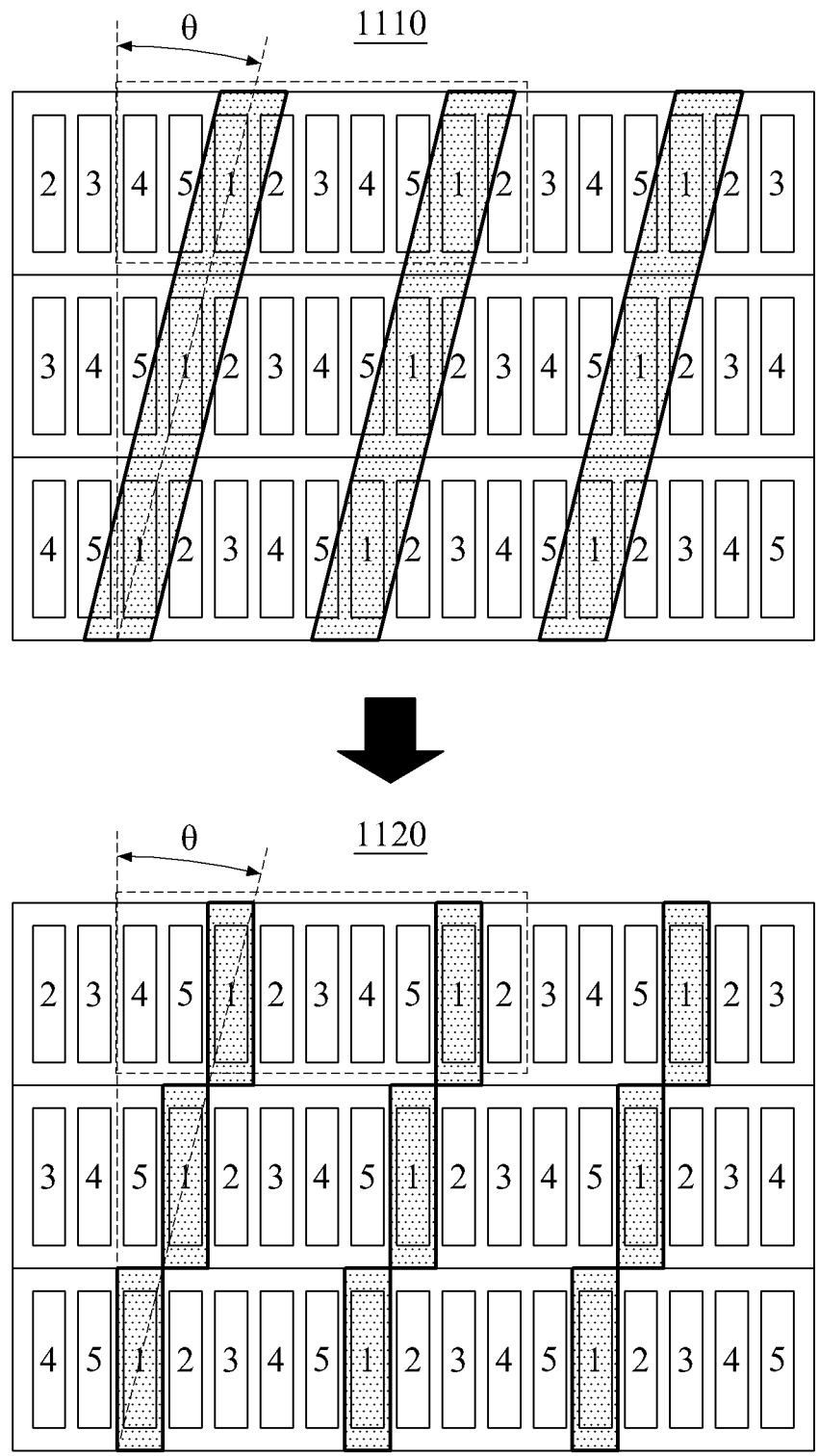
FIGS. 11 and 12 illustrate a first optical material provided in a zigzagged form according to at least one example embodiment.
Figure 12:
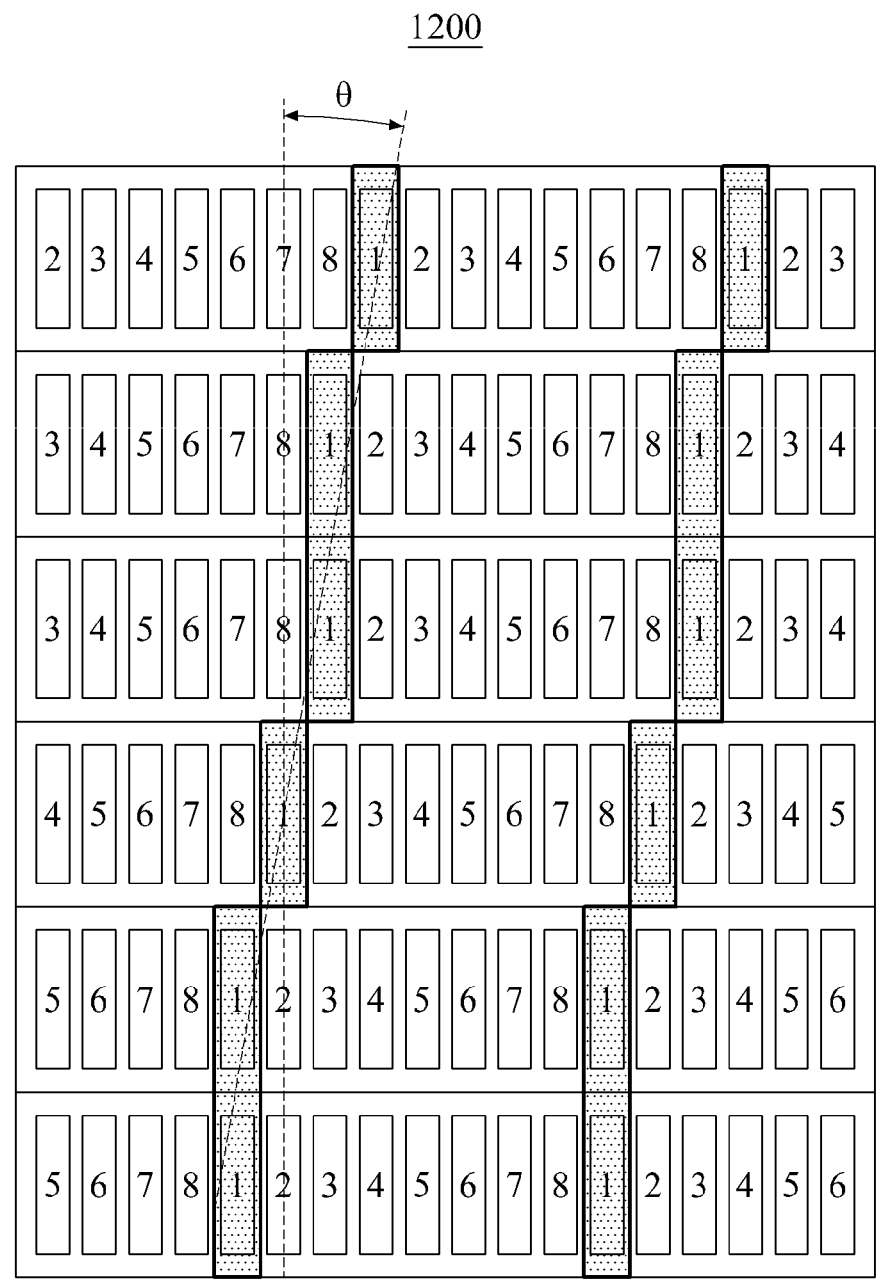

FIGS. 11 and 12 illustrate a first optical material provided in a zigzagged form according to at least one example embodiment.

FIG. 11 illustrates a multi-view display panel capable of representing a total of five views according to at least one example embodiment. For example, referring to FIG. 11, a shaded portion may correspond to a first optical material slanted at a desired (or alternatively, predetermined) angle θ with respect to a pixel of a display panel.

An example 1110 shows a case in which an image corresponding to a first view among the five views is displayed through the display panel. In the example 1110, the first optical material may be slanted at the desired (or alternatively, predetermined) angle θ with respect to the pixel included in the display panel. The first optical material may be included in an LGP positioned in a lower portion of the display panel.

An example 1120 shows a case in which the first optical material of the example 1120 is transformed to be in a zigzagged form. The first optical material may be provided on the LGP in the zigzagged form to selectively provide the light to a pixel corresponding to one of views displayed on the display panel. That is, the first optical material may be arranged in the zigzagged form to correspond to a pixel of the same view among pixels included in the display panel.

The first optical material in the zigzagged form is slanted at the desired (or alternatively, predetermined) angle θ overall with respect to the pixel of the display panel and may provide the light to pixels of a first view excluding adjacent pixels. That is, the backlight unit may block the light provided to pixels of a view adjacent to the first view by arranging first optical materials in the zigzagged form. The first optical materials in the zigzagged form may include an angulated structure of FIG. 12.

FIG. 12 illustrates a multi-view display panel having a total of eight views according to at least one example embodiment. For example, a shaded portion may correspond to a zigzagged first optical material slanted at a desired (or alternatively, predetermined) angle θ with respect to a pixel of the display panel.

An example 1200 illustrates a case in which an image corresponding to a first view among a total of eight views is displayed on the display panel. The first optical material in the zigzagged form is slanted at the desired (or alternatively, predetermined) angle θ overall with respect to the display panel and may provide the light to pixels of the first view excluding adjacent pixels. That is, the backlight unit may block the light provided to pixels of a view adjacent to the first view by arranging first optical materials in the zigzagged form. The description made above with reference to FIGS. 11 and 12 are not limited to example embodiments to which the first optical material provided in the zigzagged form is applicable, and may be applicable to a multi-view display panel having a variety of views.

FIG. 13 illustrates a process of emitting a light from an LGP according to at least one example embodiment.

Referring to FIG. 13, the LGP may include a first optical material and a second optical material having different refractive indices.

A left view of FIG. 13 refers to a design parameter of the LGP. For example, the first optical material of the LGP may have a refractive index of n1, a height of h, and a width of a1+a2. The second optical material of the LGP may have a refractive index of n2. In this example, the refractive index n1 of the first optical material may be higher than the refractive index n2 of the second optical material.

Middle and right views of FIG. 13 illustrate an example of a guide being guided by the LGP. The light being guided may pass through the second optical material and the first optical material in order of OP1, OP2, and OP3, and may be emitted toward a display panel.

Figure 14:
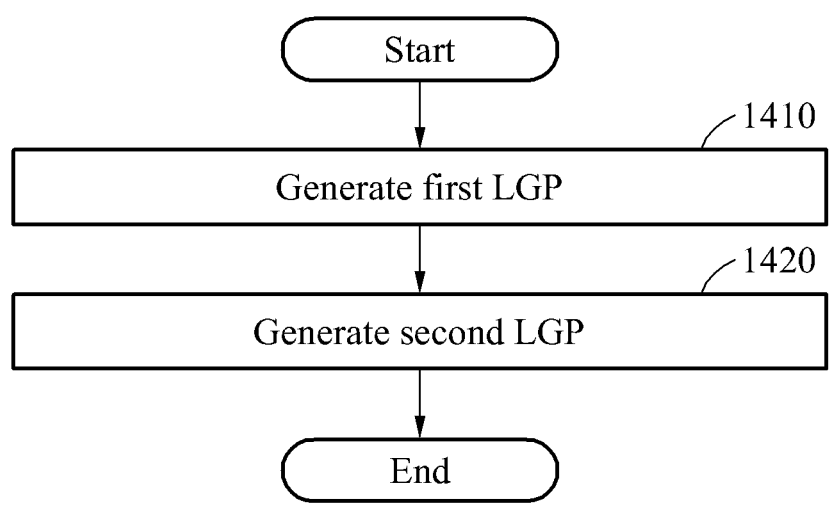
FIG. 14 is a flowchart illustrating a method of manufacturing a backlight unit according to at least one example embodiment.

FIG. 14 is a flowchart illustrating a method of manufacturing a backlight unit according to at least one example embodiment.

Referring to FIG. 14, a method of manufacturing a backlight unit may be performed by a backlight unit manufacturing apparatus, and may include operation 1410 of generating (or forming) a first LGP including a first optical material and a second optical material having different refractive indices, and configured to emit a light incident from a first light source and guided through the second optical material toward a display panel using the first optical material, and operation 1420 of generating (or forming) a second LGP disposed between the first LGP and the display panel and configured to emit a light incident from a second light source toward the display panel using a diffuser plate provided in a lower portion of the second LGP. Here, the first light source may be formed to provide the light to the first LGP when a 3D image is displayed on the display panel, and the second light source may be formed to provide the light to the second LGP when a 2D image is displayed on the display panel.

The description made above with reference to FIGS. 1 through 13 may be applicable to operations included in FIG. 14 and thus, a further description will be omitted.

According to at least one example embodiment, there may be provided a backlight unit capable of readily performing switching between 2D and 3D and having the enhanced optical efficiency by disposing, on different layers, a 2D LGP that includes a diffuser plate and a 3D LGP that includes a first optical material and a second optical material having different refractive indices.

Also, according to at least one example embodiment, it is possible to easily generate a line light source required to configure a 3D image by providing a display panel with a directional light using a first optical material and a second optical material having different refractive indices.

Also, according to at least one example embodiment, a crosstalk occurring in a stereoscopic method may be effectively decreased by configuring an LGP using a first optical material and a second optical material having different refractive indices and by disposing a parallax barrier between a display panel and the LGP.

Also, according to at least one example embodiment, it is possible to increase a degree of freedom of a ratio of a line width to a pixel width and to adjust and decrease a crosstalk of a 3D image by configuring a parallax barrier using a first optical material and a second optical material having different refractive indices.

Also, according to at least one example embodiment, it is possible to reduce (or alternatively, prevent) a light being guided in an LGP from dissipating and to enhance the optical efficiency of a 3D image by recycling the light using a reflector sheet of a 3D LGP.

Also, according to at least one example embodiment, it is possible to increase the number of views of a 3D image displayed on a display device by slanting a first optical material at a desired (or alternatively, predetermined) angle with respect to a display panel.

Also, according to at least one example embodiment, it is possible to block a light being provided to a pixel of a view adjacent to a desired (or alternatively, predetermined) view and to decrease a crosstalk by designing a first optical material slanted at a desired (or alternatively, predetermined) angle with respect to a display panel to be in a zigzagged form.

The units and/or modules described herein may be implemented using hardware components and software components. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor (e.g., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A backlight unit comprising:
 a first light guide plate (LGP) comprising a first optical material and a second optical material having different refractive indices, the first LGP being configured to emit light guided through the second optical material toward a display panel using the first optical material;
 a second LGP including a diffuser plate provided in a lower portion, the second LGP disposed above the first LGP, the second LGP being configured to emit light toward the display panel using the diffuser plate;
 a plurality of light sources; and
 a controller configured to control the plurality of light sources to provide light to the first LGP if a three-dimensional (3D) image is displayed on the display panel, and to provide light to the second LGP if a two-dimensional (2D) image is displayed on the display panel.

2. The backlight unit of claim 1, wherein the refractive index of the first optical material is higher than the refractive index of the second optical material.

3. The backlight unit of claim 1, wherein the first optical material is in an upper portion of the first LGP.

4. The backlight unit of claim 1, wherein the first optical material comprises air.

5. The backlight unit of claim 1, wherein the first optical material includes a plurality of first optical materials spaced apart from one another, and the first LGP includes a reflector sheet between the first optical materials and configured to reflect light reaching an upper portion of the first LGP, so that light incident from the light sources is emitted through the first optical material.

6. The backlight unit of claim 1, wherein the first LGP further comprises a reflector sheet between the first optical materials, and
wherein the diffuser plate is provided opposite the reflector sheet relative to a corresponding first optical material.

7. The backlight unit of claim 1, further comprising:
a gap between the first LGP and the second LGP.

8. The backlight unit of claim 1, wherein the first optical material is slanted at an angle with respect to the display panel.

9. The backlight unit of claim 8, wherein the first optical material is provided in the first LGP in a zigzagged pattern.

10. The backlight unit of claim 8, wherein the first optical material is provided in the first LGP in a zigzagged form to provide light to a pixel corresponding to one of a plurality of views displayed on the display panel.

11. A display device comprising:
a first light guide plate (LGP) comprising a first optical material and a second optical material having different refractive indices, the first LGP being configured to emit light guided through the second optical material toward a display panel using the first optical material;
a second LGP including a diffuser plate provided in a lower portion, the second LGP disposed above the first LGP, the second LGP being configured to emit light toward the display panel using a the diffuser plate;
a plurality of light sources;
a controller configured to control the plurality of light sources to provide light to the first LGP if a three-dimensional (3D) image is displayed on the display panel and to provide light to the second LGP if a two-dimensional (2D) image is displayed on the display panel; and
the display panel configured to receive light from the first LGP to display the 3D image, and configured to receive the light from the second LGP to display the 2D image.

12. The display device of claim 11, wherein the refractive index of the first optical material is higher than the refractive index of the second optical material.

13. The display device of claim 11, wherein the first optical material is slanted at an angle with respect to the display panel.

14. The display device of claim 13, wherein the first optical material is provided in the first LGP in a zigzagged pattern.

15. A method of manufacturing a display panel, the method comprising:
forming a first light guide plate (LGP) comprising a first optical material and a second optical material having different refractive indices such that the first LGP is configured to emit light incident from a first light source and guided through the second optical material toward a display panel using the first optical material;
forming a second LGP between the first LGP and the display panel such that the second LGP is configured to emit light incident from a second light source toward the display panel using a diffuser plate provided in a lower portion of the second LGP;
forming the first light source such that the first light source is configured to provide, under control of a controller, light to the first LGP if a three-dimensional (3D) image is displayed on the display panel; and
forming the second light source such that the second light source is configured to provide, under control of a controller, light to the second LGP if a two-dimensional (2D) image is displayed on the display panel.

16. The method of claim 15, wherein the refractive index of the first optical material is higher than the refractive index of the second optical material.

17. The method of claim 15, wherein the first optical material is slanted at an angle with respect to the display panel.

18. The method of claim 17, wherein the first optical material is provided in the first LGP in a zigzagged pattern.

* * * * *